June 4, 1935.  J. TWIK  2,004,022
TRUCK
Filed June 5, 1933    2 Sheets-Sheet 1

JOHN TWIK
INVENTOR

BY Victor J. Evans & Co.
ATTORNEY

June 4, 1935.　　　　　J. TWIK　　　　　2,004,022
TRUCK
Filed June 5, 1933　　　　2 Sheets-Sheet 2

JOHN TWIK, INVENTOR
BY Victor J. Evans & Co.
ATTORNEY

Patented June 4, 1935

2,004,022

UNITED STATES PATENT OFFICE 2,004,022

TRUCK

John Twik, South Ozone Park, N. Y.

Application June 5, 1933, Serial No. 674,439

1 Claim. (Cl. 214—78)

This invention relates to motor trucks and particularly to such trucks which include loading equipment.

The invention will be fully and comprehensively understood from a consideration of the following detailed description when read in connection with the accompanying drawings which form part of the application, with the understanding, however, that the improvement is capable of extended application and is not confined to the exact showing of the drawings nor to the precise construction described and, therefore, such changes and modifications may be made therein as do not affect the spirit of the invention nor exceed the scope thereof as expressed in the appended claim.

Figures 1, 2:
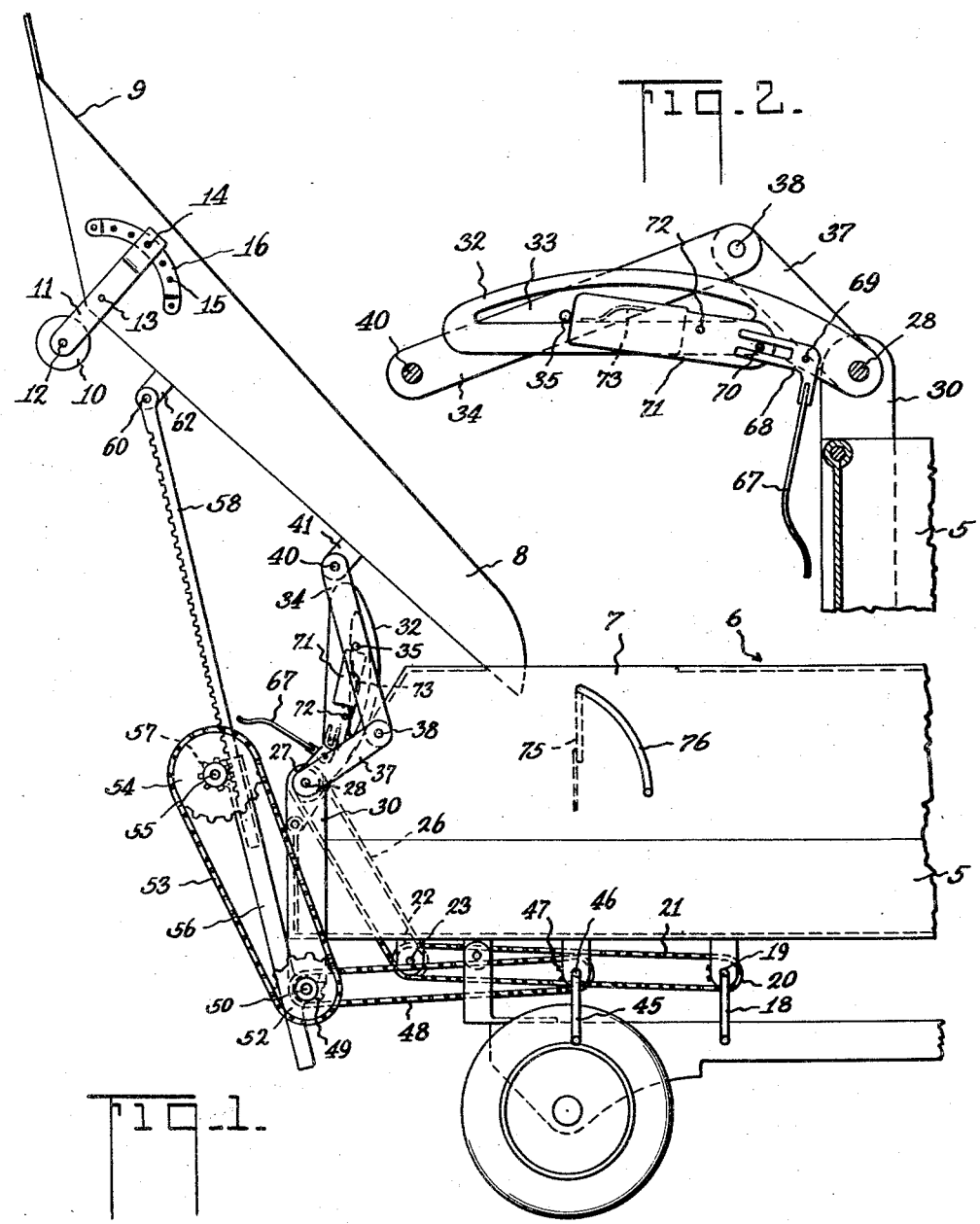
Fig. 1 is a side elevation showing the rear part of a truck and the loading equipment of my invention.
Fig. 2 is a detailed elevational view of mechanism forming part of the loading equipment.
Figure 3:
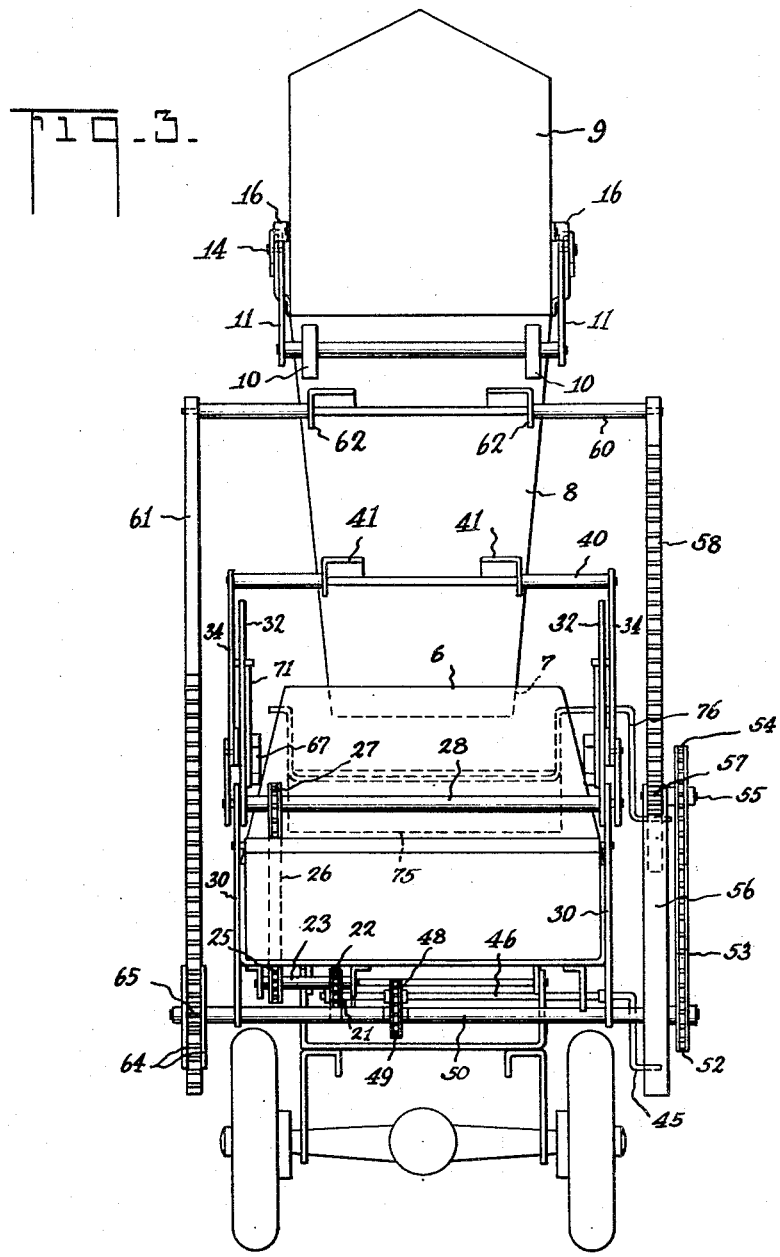
Fig. 3 is a rear elevation.

Referring to the drawings for a more detailed description thereof, the numeral 5 indicates the body of the truck, which is preferably pivotally mounted so that it may be tilted for unloading. The body has a cover 6 in the top of which there is a loading aperture 7 into which a chute 8 may extend for filling the body. Said chute is integral with a shovel 9 which is directed rearwardly of the truck. Said chute and shovel may be termed a combination chute and shovel, the same being pivotally connected to the rear of the truck so that the shovel may be lowered to the ground and then pick up dirt when the truck is backed up. When the combination chute and shovel is raised to the position shown in Figs. 2 and 3, the dirt passes from the shovel into the chute and then into the truck body. The mentioned combination chute and shovel is provided with a pair of wheels 10 which may be moved to contact the ground or not, being swingably mounted relative to the chute and shovel, as best shown in Fig. 2. In order to swingably mount the wheels 10, I provide bars 11 thru which pass the ends of the axle 12, said bars being pivotally mounted at 13 to the sides of the combination chute and shovel and apertured as indicated by the numeral 14 at their upper ends so that pins may be passed therethru and into apertures 15 of arcuate members 16, the latter being secured at their ends to the sides of the combination chute and shovel. The swingably mounted wheels are moved into contact with the ground when the chute and shovel are in lowered position but not being used to load the truck, thereafter the truck moving the shovel and chute to a position where they are to be used in loading the truck. During the loading operation, said wheels are swung to permit the shovel to contact the ground.

Said chute and shovel may be raised and lowered by the turning of a crank 18 which is located at one side of the truck body and which is adapted to turn a shaft 19 which extends transversely of and is located under the truck body and supported thereby. A sprocket wheel 20 is mounted on the distal end of said shaft 19 and a sprocket chain 21 works on said sprocket wheel and also on a sprocket wheel 22 which is mounted on a short shaft 23 suspended from the bottom of the truck. The turning of said shaft 23 by the sprocket chain 21 turns a sprocket wheel 25 mounted on the outer end of the shaft 23. The turning of the sprocket wheel 25 moves a sprocket chain 26 mounted thereon, said chains also being mounted on a sprocket 27 which is fixed on a shaft 28 which is at the rear of the truck and which has its ends rotatably mounted in vertically positioned plate members 30 secured to the rear ends of the sides of the truck body. It will therefore be seen that said shaft 28 is turned by the movement of the sprocket chain 26. Arcuate members 32 provided with slots 33 are secured to the ends of the shaft 23 to turn therewith. Links 34 are pivotally and slidably connected intermediate their ends to the slotted arcuate members 32, being positioned outside of and in contact with the outer faces of said slotted members and connected thereto by means of pins 35 headed at both ends and passing thru and slidable in the slots 33 of the arcuate members 32. The rear ends of said links 34 are pivotally connected to arms 37 by means of pins 38 and said arms 37 have their forward ends pivotally mounted on the ends of the shaft 28. The rear ends of the links 34 are pivotally connected to the ends of a shaft 40, which is journalled in brackets 41 which are secured to the bottom of the chute 8 of the combination chute and shovel. From the foregoing description it will be seen that the turning of the shaft 28 is effective to raise and lower the chute.

I provide mechanism whereby the combination chute and shovel may be tilted to the desired extent, said mechanism comprising a crank 45 adapted to turn a shaft 46 which is rotatably suspended from the bottom of the truck body and which carries at its distal end a sprocket wheel 47 on which is mounted a sprocket chain 48, said chain also being mounted on a sprocket wheel 49 which is fixedly mounted on a shaft 50, said shaft being rotatably mounted in the lower ends of said vertical members 30. It will thus be seen that movement of the sprocket chain 48 is effective to turn the shaft 50. On the right end of shaft 50 is fixedly mounted a sprocket wheel 52 which rotates a sprocket chain 53 mounted thereon, said sprocket chain also being mounted on a sprocket wheel 54 which turns on a shaft 55, said shaft having one of its ends pivotally mounted in a sleeve 56 which is pivotally connected to the right end portion of the shaft 50. Said shaft 55 carries a pinion 57 engaging the rack 58 which moves in said sleeve, the latter acting as a guide for the rack. From the foregoing description it will be seen that rotation of the shaft 50 is effective to move the rack 58 in and out of the sleeve 56 thru motion of the sprocket wheel 52, the chain 53, the sprocket wheel 54, shaft 55 and pinion 57. The rear end of the rack 58 carries one end of a rod 60, the other end of said rod being carried by a rack 61, said rod 60 being rotatably mounted in brackets 62 which are secured to the bottom of the chute 8. Said rack 61 is moved between a pair of guide plates 64 by means of a pinion 65 which is fixedly mounted on an end of the shaft 50. It will thus be seen that the turning of the shaft 50 moves the rack 61 by means of the pinion 65. Movement of said racks in the direction of their lengths is effective together with the pivotal movement of said racks to tilt the combination chute and shovel to any desired degree when loading the truck.

Shock absorbers in the form of springs 67 are adapted to be pressed against the back of the truck body and absorb the shock when the combination chute and shovel are let down, said springs being secured at one end to L-shaped members 68 which are pivoted at 69 to the arcuate slotted members 32. Said L-shaped members 68 have bifurcated ends to receive between the branches of said ends pins 70 which extend inwardly from plates 71 which are pivotally connected at 72 to the slotted arcuate members 32. Said plates 71 contact with and slide on the inner faces of the slotted plates 32 and are bent over at their upper ends to pass thru the slots 33 and bent downwardly onto the outer faces of the plates 32, said plates being so formed to constitute channels in which are positioned springs 73 secured to the arcuate members adjacent the slots 33. Said springs 73 hold the rear ends of the members 71 in such position that the pins 35 may rest on said rear ends when the shovel and chute are in dumping or loading positions.

A spreader 75 has its ends journalled in the sides of the cover so that it may be rocked by means of a crank 76 on the outside of the cover to distribute the dirt in the truck, said spreader being U-shaped.

What is claimed is:

In a truck, a body, a shovel adjacent one end of said body and having a scooping end and a delivery end, means pivotally connected to the shovel adjacent the delivery end of the latter for elevating and lowering that end and means pivotally connected to the shovel adjacent the scooping end for raising and lowering the latter end and for varying the shoveling angle and the delivery angle of the shovel.

JOHN TWIK.